United States Patent
Zhong et al.

(10) Patent No.: US 11,783,446 B2
(45) Date of Patent: Oct. 10, 2023

(54) LARGE-FIELD-ANGLE IMAGE REAL-TIME STITCHING METHOD BASED ON CALIBRATION

(71) Applicant: DALIAN UNIVERSITY OF TECHNOLOGY, Liaoning (CN)

(72) Inventors: Wei Zhong, Liaoning (CN); Yuankai Xiang, Liaoning (CN); Haojie Li, Liaoning (CN); Zhihui Wang, Liaoning (CN); Risheng Liu, Liaoning (CN); Xin Fan, Liaoning (CN); Zhongxuan Luo, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 371 days.

(21) Appl. No.: 17/282,635

(22) PCT Filed: Mar. 5, 2020

(86) PCT No.: PCT/CN2020/077954
§ 371 (c)(1),
(2) Date: Apr. 2, 2021

(87) PCT Pub. No.: WO2021/120405
PCT Pub. Date: Jun. 24, 2021

(65) Prior Publication Data
US 2022/0044356 A1 Feb. 10, 2022

(30) Foreign Application Priority Data

Dec. 17, 2019 (CN) .......................... 201911304493.7

(51) Int. Cl.
*G06T 3/40* (2006.01)
*G06T 7/80* (2017.01)
*G06T 5/40* (2006.01)

(52) U.S. Cl.
CPC .............. *G06T 3/4038* (2013.01); *G06T 5/40* (2013.01); *G06T 7/80* (2017.01); *G06T 2207/20021* (2013.01); *G06T 2207/20221* (2013.01)

(58) Field of Classification Search
CPC ........... G06T 3/4038; G06T 5/40; G06T 7/80; G06T 2207/20021; G06T 2207/20221;
(Continued)

(56) References Cited

U.S. PATENT DOCUMENTS 10,127,631 B1 11/2018 Duan et al.
10,373,362 B2 * 8/2019 Fine ........................ H04N 23/69
(Continued)

FOREIGN PATENT DOCUMENTS

CN 105608667 A 5/2016
CN 105931186 A 9/2016
(Continued)

*Primary Examiner* — Molly Wilburn
(74) *Attorney, Agent, or Firm* — MUNCY, GEISSLER, OLDS & LOWE, P.C.

(57) ABSTRACT

The present invention discloses a large-field-angle image real-time stitching method based on calibration. First, a calibration algorithm is used to solve the positional relationship between cameras, and the prior information is used to solve a homography matrix between images. The system is easy to build, and the program is simple and easy to implement; an overlapping area ROI of images can be calculated by the homography matrix between images, and an energy model thereof can be built and solved with a graph cut algorithm; the graph cut algorithm has high time complexity and depends on the number of nodes in a graph; here, images are divided into layers, and solutions are obtained layer by layer and iterated; and finally, a stitched image is further optimized by simple linear fusion of stitching seams and histogram equalization of the stitched image.

3 Claims, 2 Drawing Sheets

(58) Field of Classification Search
CPC . G06T 2207/10024; G06T 2207/20072; G06T 2207/30208; G06T 3/0068; G06T 5/50
See application file for complete search history.

(56) References Cited

U.S. PATENT DOCUMENTS

| | | | |
|---|---|---|---|
| 2009/0021614 A1* | 1/2009 | Baker | H04N 23/698 |
| | | | 348/262 |
| 2015/0124049 A1* | 5/2015 | Kimura | H04N 23/631 |
| | | | 348/39 |
| 2016/0269717 A1* | 9/2016 | Kato | H04N 13/239 |
| 2017/0068840 A1 | 3/2017 | Chaki et al. | |
| 2017/0277961 A1* | 9/2017 | Kuehnle | G06T 7/80 |
| 2019/0313070 A1* | 10/2019 | Boujut-Burgun | G06T 7/70 |

FOREIGN PATENT DOCUMENTS

| | | |
|---|---|---|
| CN | 105957007 A | 9/2017 |
| CN | 109064410 A | 12/2018 |
| CN | 109840884 A | 6/2019 |

\* cited by examiner

Left image (a)

Right image (b)

Stitched image (c)

LARGE-FIELD-ANGLE IMAGE REAL-TIME STITCHING METHOD BASED ON CALIBRATION

TECHNICAL FIELD

The present invention belongs to the field of image processing and computer vision, and relates to calculating a homography matrix between images through RT between cameras, and finding an optimal transition area between images by graph cut. Post-processing is conducted on images by feathering fusion and histogram equalization, which makes the stitching result more natural.

BACKGROUND

At present, driverless technology is developing rapidly, and safety needs to be ensured for driverless technology. The larger the field angle of a vehicle is, the more complete the information obtained will be, and the higher the guarantee of driving safety will be. Although a camera with a wide-angle lens has a large field angle, the observation distance is limited due to large image distortion. In order to achieve the effect of a large field angle, images from multiple cameras need to be stitched together and displayed in real time. Currently, the following three methods are mainly used for stitching images:

1 Global alignment method:

This method is to align images through a homography matrix, which is to extract feature matching points between images first, and then solve the homography matrix between images. The advantages are simple processing and high processing speed, but this method is only suitable for stitching images with a small disparity, which has great limitations.

2 Stitching method based on mesh optimization represented by APAP (As-Projective-As-Possible):

This method is to divide an image into $C_1*C_2$ mesh blocks, extract the feature points of the image, solve the homography matrix of each mesh, and finally perform stitching. This method has a good stitching effect; however, this method depends on image content, has relatively high requirements on the number of feature points and the steps, and has a large amount of calculation; therefore, this method is only suitable for stitching images with a small disparity, and is difficult to achieve real-time performance.

3 Seam-driven method:

This method is to extract feature matching points between images first, then align an overlapping area of images, and solve an optimal stitching seam of the overlapping area through a graph cut algorithm. This method is suitable for stitching images with a large disparity, but the algorithm has high complexity and poor real-time performance, so this method is difficult to apply in practice.

An image stitching process requires pre-registration, and it takes a lot of time to match feature points. Experiments show that camera angles are fixed, the positional relationship RT between cameras and the internal parameters K of cameras can be calculated by a calibration algorithm, and the homography matrix between two images can be derived through RT and the internal parameters K of cameras, and through the relationship between a global coordinate system and an image coordinate system, so that the feature point matching time is omitted by the prior information. Image registration is completed and solutions are obtained by a graph cut algorithm. As the graph cut algorithm is time-consuming, in order to achieve real-time performance, the images need to be processed layer by layer to reduce the calculation complexity of graph cut. After a stitching seam is found, the vision on both sides of the seam looks unnatural, therefore the pixels on both sides of the seam are processed by feathering fusion, and histogram equalization is conduct, so as to make the stitching result more natural.

SUMMARY

To overcome the defects in the prior art, the present invention provides a method in which a homography matrix between images is pre-solved based on the prior information (i.e., the positional relationship RT between cameras), and the traditional graph cut algorithm is improved to combine the speed and effect thereof and achieve optimal real-time stitching.

The present invention has the following specific technical solution:

A large-field-angle image stitching method based on multi-view cameras, comprising the following steps:

1) Calibrating internal parameters and external parameters of each camera; the internal parameters include a focal length and an optical center; and the external parameters include rotation and translation;

2) Calculating homography matrix: calculating a homography matrix between images according to the internal and external parameters of each camera, the placement angle between cameras, and a scene plane distance d;

3) Building overlapping area model: using the homography matrix between images in step 2) to calculate an overlapping area ROI of images, and modeling the overlapping area;

4) Dividing each image into blocks with a size of $C_1*C_2$, taking the divided blocks as nodes of a graph, performing graph cut to find a local optimal solution, then continuing to divide each node corresponding to an optimal stitching line corresponding to $C_1*C_2$ until a final block size is equal to a pixel value, and finally and approximately finding a global optimal solution by finding the local optimal solution each time;

5) Conducting histogram equalization for exposure compensation; and

6) Conducting histogram equalization.

The calculation of the homography matrix specifically comprises the following steps:

2-1) Getting the internal parameters K of each camera, the placement relationship RT between cameras, and a scene plane distance d through camera calibration; and a formula is as follows:

$$H = K_1\left(R + T\frac{1}{d}N^T\right)K_2^{-1}$$

Wherein $K_1$ and $K_2$ are respectively the internal parameters of a left and a right cameras, RT is the external parameters of the cameras, R represents a rotation matrix, T represents a translation vector, and an appropriate value is selected for d according to actual conditions.

The building of the mathematical model specifically comprises the following steps:

3-1) For the pixels of two images in the overlapping area, calculating the second norm of the RGB pixels corresponding to the overlapping area of the two images, and building t-links; the calculation formulas of the second norm are as follows:

$$e(p,q) = \|p-p'\| + \|q-q'\|$$

$$\|p-p'\| = (R_p - R_{p'})^2 + (G_p - G_{p'})^2 + (B_p - B_{p'})^2$$

$$\|q-q'\| = (R_q - R_{q'})^2 + (G_q - G_{q'})^2 + (B_q - B_{q'})^2$$

Wherein e(•) is a weight function, p is a source image, q is a target image, p is the pixel value of one point in the image p, p' is the pixel value of a p adjacent point, q is the pixel value of one point in the target image, q' is the pixel value of a q adjacent point, $R_p$ is the value of R channel at p point, $R_{p'}$ is the value of R channel at p' point, $G_p$ is the value of G channel at p point, $G_{p'}$ is the value of G channel at p' point, $B_p$ is the value of B channel at p point, $B_{p'}$ is the value of B channel at p' point, $R_q$ is the value of R channel at q point, $R_{q'}$ is the value of R channel at q' point, $G_q$ is the value of G channel at q point, $G_{q'}$ is the value of G channel at q' point, $B_q$ is the value of B channel at q point, and $B_{q'}$ is the value of B channel at q' point;

3-2) Finding the optimal stitching line for the built model, and solving (the stitching seam) by graph cut;

An energy function is defined as:

$$E(f) = \sum_{p,q \in N} S_{p,q}(l_p, l_q) + \sum_{p \in P} D_P(l_p)$$

Wherein $S_{p,q}$ is a smoothing term representing the cost of assigning a pair of pixels (p, q) in the overlapping area to $(l_p, l_q)$, $l_p$ is a label assigned to the pixel p, $l_q$ is a label assigned to the pixel q, and $D_p$ is a data term representing the cost of marking the pixel p in the overlapping area as $l_p$;

3-3) Conducting feathering fusion, and seeking simple linear fusion of pixels around a rear stitching seam to make the visual effect of images more natural. The principle of feathering is to smooth the boundary and achieve the effect of natural convergence through the method of gradual change. When applied to image stitching, feathering is to process only the areas on both sides of the stitching line, and the formulas thereof are:

$$g(x) = (1 - \alpha)f_0(x) + \alpha f_1(x)$$

$$\alpha = \frac{d_{pro} - d_{dst}}{d_{pro}}$$

Wherein g(x) represents the pixel value after fusion, α is a weight coefficient, $f_0(x)$ is the pixel value of image 1, $f_1(x)$ is the pixel value of image 2, $d_{pro}$ represents the width of a processing area, and $d_{dst}$ represents the distance between the current pixel and the stitching seam in x direction.

The present invention has the following beneficial effects: the present invention realizes large-field-angle panoramic display; the algorithm achieves real-time performance, and realizes large-disparity panoramic image stitching. The present invention has the following advantages:

1. The program has low requirements on memory and hardware, and can achieve real-time performance on Nvidia TX2;
2. The program is simple and easy to implement; and
3. After obtained, the prior information can be directly passed in as parameters to be used as default values.

The present invention makes full use of the prior information of the images and reduces the time of image regis-tration. The method proposed has good scalability; and panoramic display of multiple pairs of cameras can be realized by simply inputting RT and internal parameters K of cameras, and setting d value by oneself.

DETAILED DESCRIPTION

The present invention proposes a large-field-angle image stitching method based on multi-view cameras, and will be described in detail below in combination with drawings and embodiments.

Figure 1:
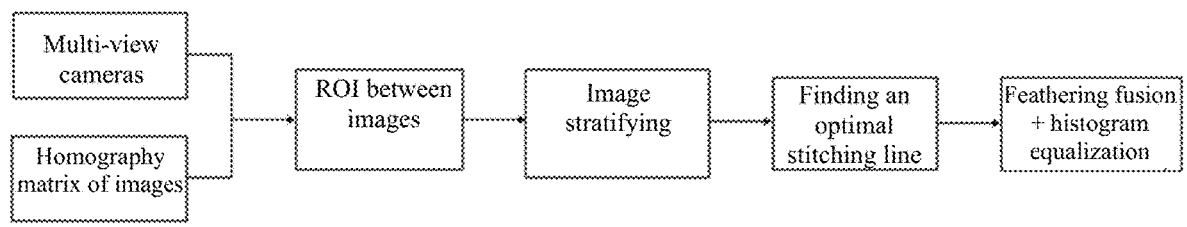
FIG. 1 is a system actually built.
Figure 2:
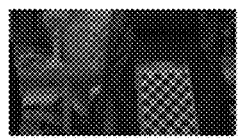
FIG. 2 is data collected by a system. Wherein (a) is the data collected from a left viewpoint, (b) is the data collected from a right viewpoint, and (c) is a stitched image.
Figure 2:
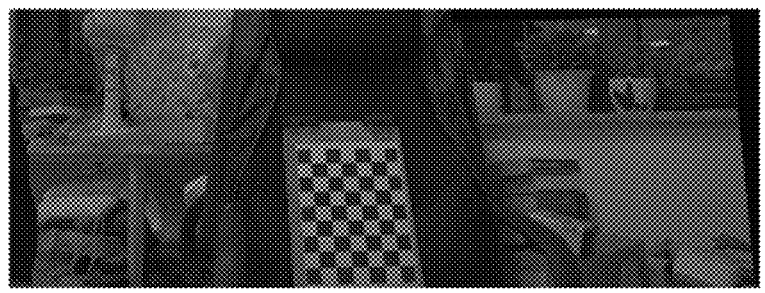
Figure 2:
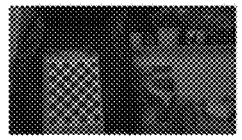
Figure 3:
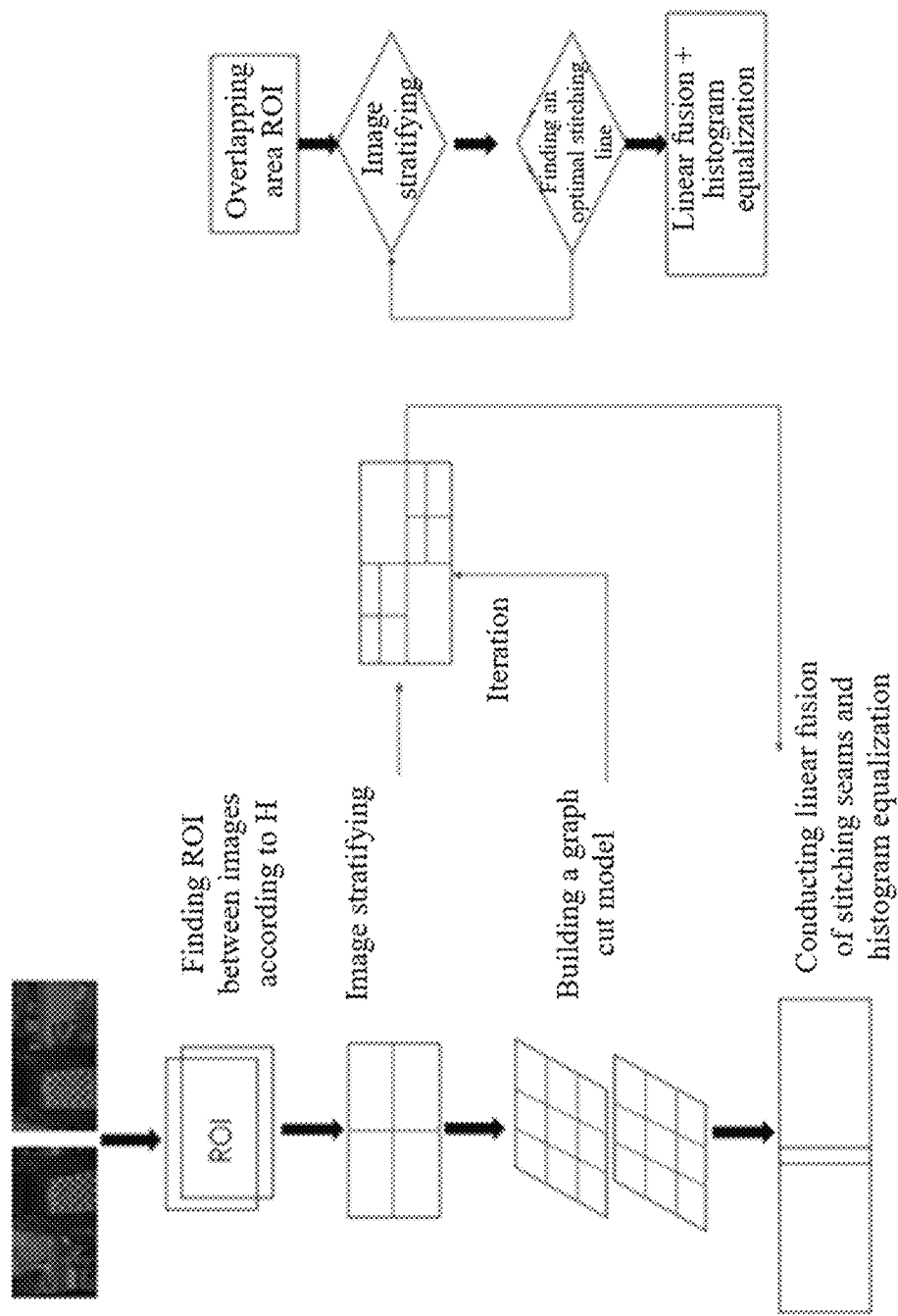
FIG. 3 is a flow chart for actual implementation.

The present invention uses horizontally placed multi-view cameras as an imaging system to perform multi-viewpoint image collection, wherein $K_1$ is a left viewpoint (main viewpoint), $K_2$ is an intermediate viewpoint, and $K_3$ is a right viewpoint. The color camera resolution in each camera is 1024×768, and the video frame rate is 30 frames per second, as shown in FIG. 1. The RT relationship between each pair of cameras to be stitched is calculated on this basis, and the homography matrix H between images is calculated through RT and the distance d of an imaging plane; the horizontal translation of each image is calculated by taking an intermediate image as a benchmark; and finally, the calculated parameters are used as inputs for stitching. The specific process is as follows:

1) System calibration and data collection;
   1-1) Calibrating the multi-view cameras to obtain the internal parameters including focal length and optical center and the external parameters including rotation and translation of the multi-view cameras;
   1-2) Connecting the cameras to three computers, and using a router to control and conduct synchronous data collection;
   1-3) Using special customized calibration boards to collect images at the same time; paying attention to ensure that the positional relationship between the cameras is consistent during the collection process and keep the calibration boards fixed; and rotating the calibration boards to collect 10-15 groups of images for each pair of cameras according to the actual conditions.
2) Calculating homography matrix between image transformations:
   2-1) Imaging a plane in a scene by two cameras, and assuming that the unit normal vector of the plane in the coordinate system of the first camera is N, and the distance from the plane to the center (coordinate origin) of the first camera is d, then the plane π can be expressed as:

$$N^T X_1 = d$$

$X_1$ is the coordinate of a three-dimensional point PP in the coordinate system of the first camera, and the coordinate of the three-dimensional point PP in the coordinate system of the second camera is $X_2$, then the relationship between the two is:

$$X_2 = R*X_1 + T$$

$$X_2 = RX_1 + T\frac{1}{d}N^T X_1 = \left(R + T\frac{1}{d}N^T\right)X_1 = H'X_1$$

2-2) Obtaining the homography matrix obtained above from the coordinate system of the first camera, and the homography matrix needs to be transformed into the coordinate system of the imaging plane:

$$x_1 = KX_1$$

$$x_2 = KX_2$$

$$H = KH'K^{-1}$$

The value of d in the above formula can be set manually, the rest are fixed values, and K is a known internal parameter of the cameras.

3) Calculating overlapping area and solving optimal stitching seam by modeling: first, calculating an overlapping area ROI through the homography matrix between images, and then building an overlapping area model;

3-1) Calculating the size of the overlapping area by the homography matrix between images:

Taking the four vertices (0, 0), (img.cols, 0), (img.cols, img.rows) and (0, img.rows) of an image, calculating the transformed coordinates, and the transformed upper left corner coordinate is for the stitched image;

The calculation formulas are:
The transformation matrix is:

$$\begin{bmatrix} a_{11} & a_{12} & a_{13} \\ a_{21} & a_{22} & a_{23} \\ a_{31} & a_{32} & a_{33} \end{bmatrix}$$

$$x = \frac{a_{11}u + a_{12}v + a_{13}}{a_{31}u + a_{32}v + a_{33}}$$

$$y = \frac{a_{21}u + a_{22}v + a_{23}}{a_{31}u + a_{32}v + a_{33}}$$

Wherein x is the x-coordinate of the source image p point after perspective transformation, y is the y-coordinate of the source image p point after perspective transformation, u is the x-coordinate of the source image p point, and v is the y-coordinate of the source image p point;

3-2) Building an energy model (seam-driven image stitching), and constructing an energy function of a graph cut algorithm:

$$E(l) = \sum_{p \in P} D_p(l_p) + \sum_{p,q \in N} S_{p,q}(l_p, l_q)$$

Wherein $S_{p,q}$ is a boundary term, $l_p$ is an RGB value corresponding to p point in the overlapping area, $l_q$ is an RGB value corresponding to q point in the overlapping area, and data term $D_p(l_p)$ represents the assignment of pixel p in the overlapping area;

$$\begin{cases} D_p(1) = 0 \; D_p(0) = \mu & \text{if } p \in \partial I_0 \cap \partial P \\ D_p(0) = 0 \; D_p(1) = \mu & \text{if } p \in \partial I_1 \cap \partial P \\ D_p(0) = D_p(1) = 0 & \text{otherwise} \end{cases}$$

In order to avoid marking errors, μ is set to be a very large number;

$S_{p,q}(l_p, l_q)$ is a smoothing term:

$$S_{p,q}(l_p, l_q) = I_*(p) + I_*(q)$$

$$I_*(p) = \|I_0(\bullet) - I_1(\bullet)\|_2$$

Wherein $I_*(p)$ is the Euclidean distance of pixel p in the overlapping area corresponding to the color difference between the source image and the target image, $I_*(q)$ is the Euclidean distance of pixel q in the overlapping area corresponding to the color difference between the source image and the target image, and $\|\bullet\|_2$ represents the second norm of the matrix;

3-3) After the model is built, obtaining a solution by graph cut, and the result is an optimal stitching seam. It can be known that the construction of the energy function is very important for the result of the stitching seam.

3-4) As the operation time of graph cut is related to the number of nodes in a graph, and the algorithm complexity is relatively high, only by down-sampling or stratifying the overlapping area to reduce the number of nodes in the constructed graph, and making the local optimal solution obtained by this method be approximately equal to the global optimal solution, can the real-time performance of the algorithm meet requirements.

3-4) In addition, the parallelization of the graph cut algorithm can also achieve a further acceleration effect. (Fast graphcut on GPU CVPR2008)

3-5) Linear fusion: the stitching seam obtained by the graph cut algorithm still looks unnatural, so a simple linear fusion method is adopted here, and the pixels around the stitching seam and the distance from the pixels to the stitching seam are weighted and fused, which makes the vision look more natural.

3-6) Histogram equalization: conducting histogram equalization on images to reduce exposure difference.

The invention claimed is:

1. A large-field-angle image real-time stitching method based on calibration, comprising the following steps:

1) Calibrating internal parameters and external parameters of each camera; the internal parameters include a focal length and an optical center; and the external parameters include rotation and translation;

2) Calculating homography matrix: calculating a homography matrix between images according to the internal and external parameters of each camera, the placement angle between cameras, and a scene plane distance d;

3) Building overlapping area model: using the homography matrix between images in step 2) to calculate an overlapping area ROI of images, and modeling the overlapping area;

4) dividing each image into blocks with a size of $C_1*C_2$ taking the divided blocks as nodes of a graph, performing graph cut to find a local optimal solution, then continuing to divide each node corresponding to an optimal stitching line corresponding to $C_1*C_2$ until a final block size is equal to a pixel value, and finally and approximately finding a global optimal solution by finding the local optimal solution each time;

5) conducting histogram equalization for exposure compensation; and 6) conducting histogram equalization to reduce image exposure difference.

2. The large-field-angle image real-time stitching method based on calibration according to claim 1, wherein the calculation of the homography matrix in step 2) specifically comprises the following steps:

2-1) imaging a plane in a scene by two cameras, and assuming that the unit normal vector of the plane in the coordinate system of the first camera is N, the distance from the plane to the center i.e. coordinate origin, of the first camera is d, and an appropriate value is selected for d according to actual conditions, then the plane π can be expressed as:

$$N^T X_1 = d$$

wherein the internal parameters K of each camera are known, $X_1$ is the coordinate of a three-dimensional point PP in the coordinate system of the first camera, and the coordinate of the three-dimensional point PP in the coordinate system of the second camera is $X_2$, then the relationship between the two is:

$$X_2 = R*X_1 + T$$

$$X_2 = RX_1 + T1/d\ N^T X_1 = (R + T1/d\ N^T)X_1 = H'X_1$$

2-2) obtaining the homography matrix from the coordinate system of the first camera, and the homography matrix needs to be transformed into the coordinate system of the imaging plane:

$$x_1 = KX_1$$

$$x_2 = KX_2$$

$$H = KH'K^{-1}$$

3. The large-field-angle image real-time stitching method based on calibration according to claim 1, wherein the building of the mathematical model in step 3) specifically comprises the following steps:

3-1) for the pixels of two images in the overlapping area: calculating a second norm of RGB pixels corresponding to the overlapping area of the two images, and building t-links; the calculation formulas of the second norm are as follows:

$$e(p,q) = \|\nabla p - \nabla p'\| + \|\nabla q - \nabla q'\|$$

$$\|\nabla q - \nabla p'\| = (R_p - R_{p'})^2 + (G_p - G_{p'})^2 + (B_p - B_{p'})^2$$

$$\|\nabla q - \nabla p'\| = (R_q - R_{q'})^2 + (G_q - G_{q'})^2 + (B_q - B_{q'})^2$$

wherein e(•) is a weight function, p is a source image, q is a target image, p is the pixel value of one point in the image p, p' is the pixel value of a p adjacent point, q is the pixel value of one point in the target image, q' is the pixel value of a q adjacent point, $R_p$ is the value of R channel at p point, $R_{p'}$ is the value of R channel at p' point, $G_p$ is the value of G channel at p point, $G_{p'}$ is the value of G channel at p' point, $B_p$ is the value of B channel at p point, $B_{p'}$ is the value of B channel at p' point, $R_q$ is the value of R channel at q point, $R_{q'}$ is the value of R channel at q' point, $G_q$ is the value of G channel at q point, $G_{q'}$ is the value of G channel at q' point, $B_q$ is the value of B channel at q a point, and $B_{q'}$ is the value of B channel at q' point;

3-2) finding an optimal stitching line (i.e., stitching seam) for the built model: solving the stitching seam by graph cut;

giving a set of registered images represented by $I_0$ and $I_1$; letting P be the overlapping area, L={0,1} represents a label set, wherein 0 is corresponding to $I_0$, and 1 is corresponding to $I_1$; the stitching seam represents the pixels located in the overlapping area, which are respectively marked as 0 and 1 labels to minimize the energy; an energy function is defined as:

$$E(f) = \Sigma_{p,q \in N} S_{p,q}(l_p, l_q) + \Sigma_{p \in P} (l_p)$$

wherein $S_{p,q}$ is a smoothing term representing the cost of assigning a pair of pixels p, q) in the overlapping area to ($l_p$, $l_q$), $l_p$ is a label assigned to the pixel p, $l_q$ is a label assigned to the pixel q, and $D_p$ is a data term representing the cost of marking the pixel p in the overlapping area as $l_p$;

3-3) conducting feathering fusion, wherein feathering is to process only the areas on both sides of the stitching line, and the formulas thereof are:

$$g(x) = (1-\alpha)f_0(x) + \alpha f_1(x)$$

$$\alpha = d_{pro} - d_{dst}/d_{pro}$$

wherein g(x) represents the pixel value after fusion, α is a weight coefficient, $f_0(x)$ is the pixel value of image 1, $f_1(x)$ is the pixel value of image 2, $d_{pro}$ represents the width of a processing area, and $d_{dst}$ represents the distance between the current pixel and the stitching seam in x direction.

\* \* \* \* \*